(No Model.)  5 Sheets—Sheet 1.

W. D. PARKER & E. H. WHITE.
AUTOMATIC PIANO PLAYER.

No. 592,641.  Patented Oct. 26, 1897.

Witnesses
Ella P. Blenus
Chas. H. Burleigh

Inventors.
William D. Parker
Edward H. White
By Chas. H. Burleigh
Attorney

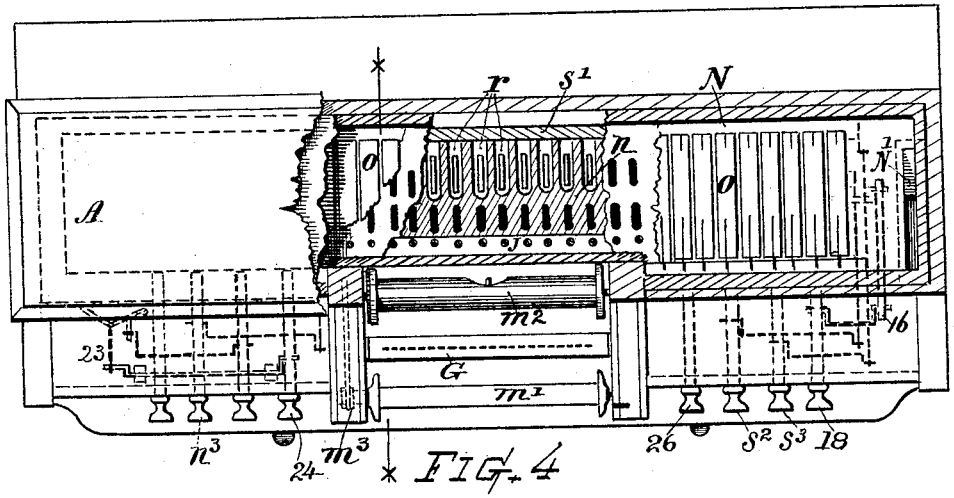
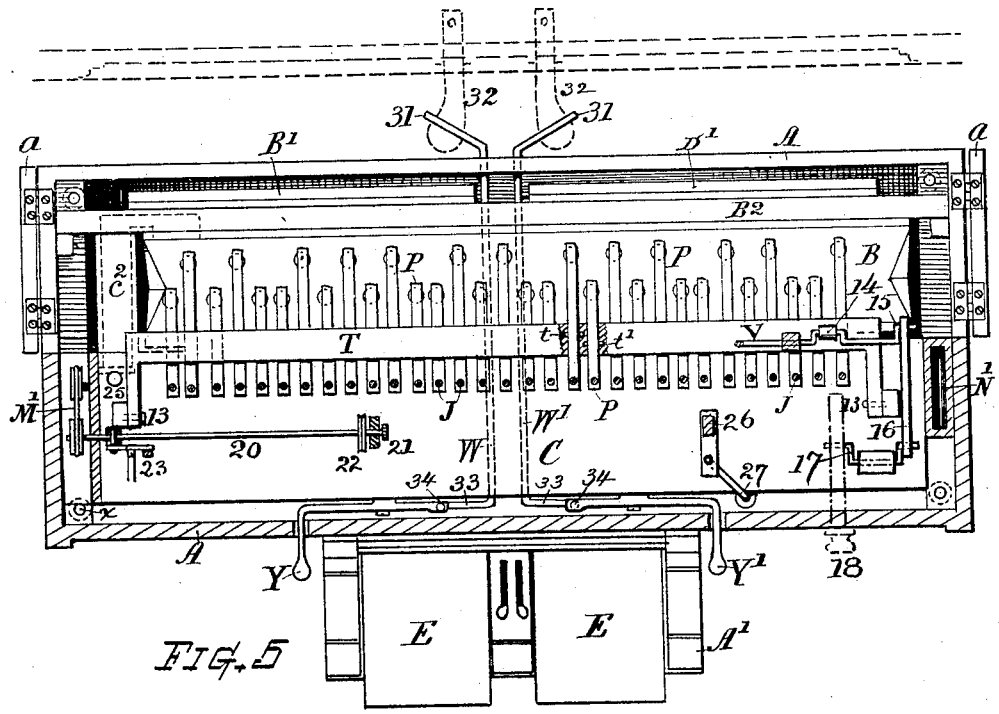

(No Model.) 5 Sheets—Sheet 3.
W. D. PARKER & E. H. WHITE.
AUTOMATIC PIANO PLAYER.
No. 592,641. Patented Oct. 26, 1897.
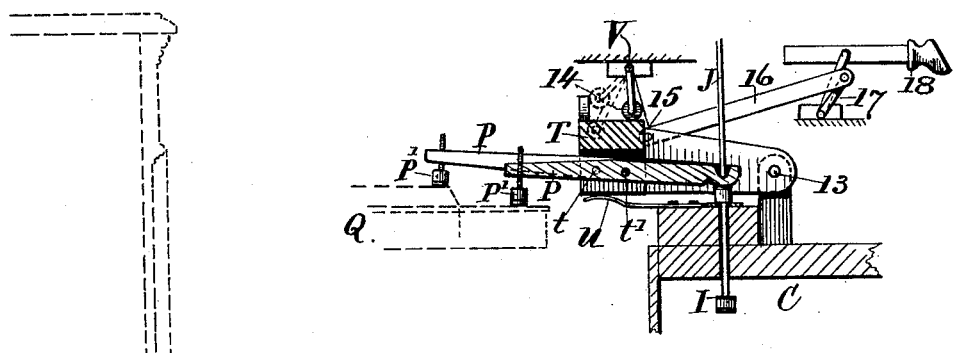
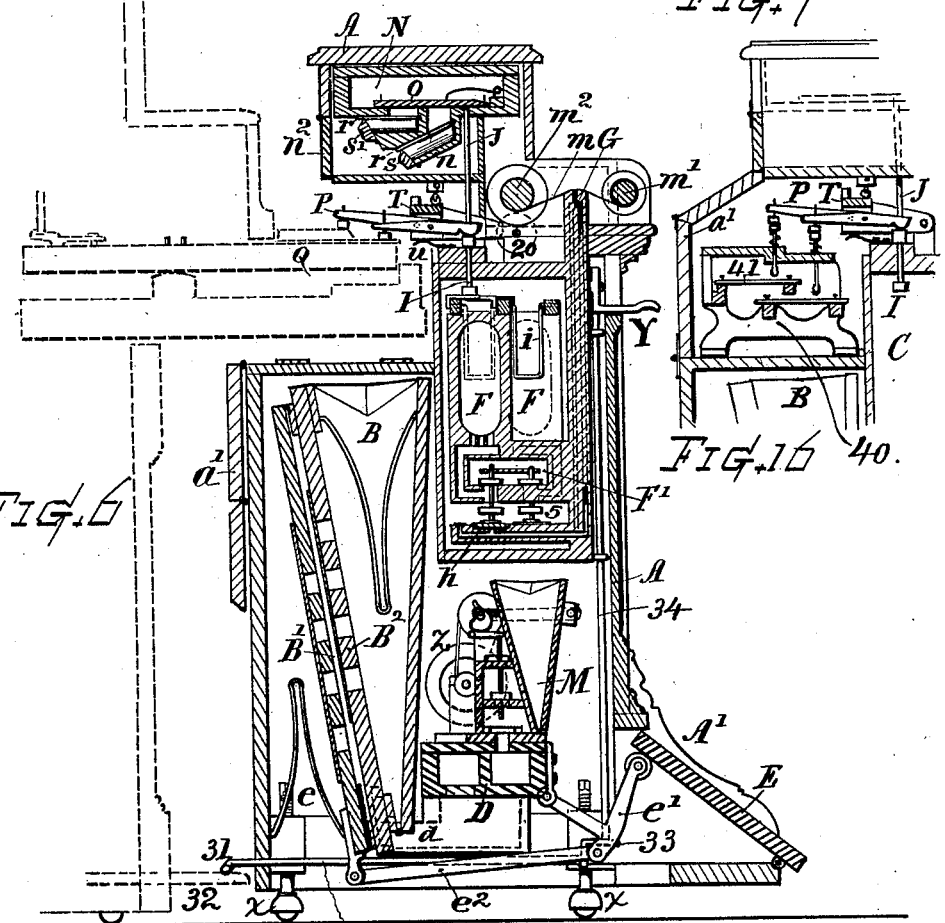
Witnesses
Ella P. Blenus
Chas. H. Burleigh
Inventors.
William D. Parker
Edward H. White
By Chas. H. Burleigh
Attorney

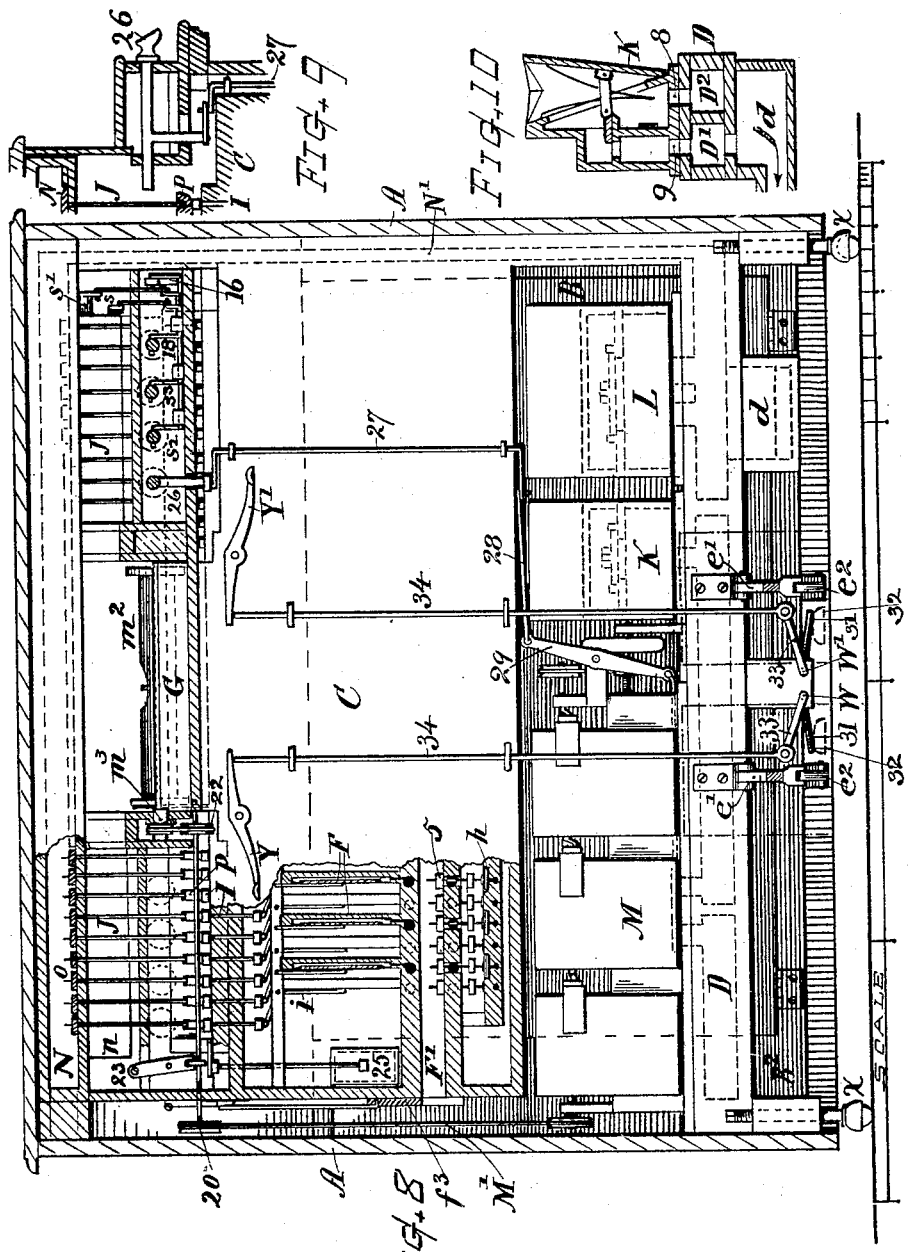

(No Model.) 5 Sheets—Sheet 5.

W. D. PARKER & E. H. WHITE.
AUTOMATIC PIANO PLAYER.

No. 592,641. Patented Oct. 26, 1897.

Witnesses.
Ella P. Blenus.
Chas. Schr. Burleigh

Inventors.
William D. Parker
Edward H. White
By Chas. H. Burleigh
Attorney

UNITED STATES PATENT OFFICE.

WILLIAM D. PARKER AND EDWARD H. WHITE, OF MERIDEN, CONNECTICUT; SAID PARKER ASSIGNOR TO SAID WHITE.

AUTOMATIC PIANO-PLAYER.

SPECIFICATION forming part of Letters Patent No. 592,641, dated October 26, 1897.

Application filed April 5, 1897. Serial No. 630,669. (No model.)

*To all whom it may concern:*

Be it known that we, WILLIAM D. PARKER and EDWARD H. WHITE, citizens of the United States, residing at Meriden, in the county of New Haven and State of Connecticut, have invented a new and useful Automatic Piano-Player, of which the following, together with the accompanying drawings, is a specification sufficiently full, clear, and exact to enable persons skilled in the art to which this invention appertains to make and use the same.

This invention relates to an improved construction and organization of mechanism in a musical instrument adapted as a cabinet automatic piano-player and operative either as a separate pneumatic organ or as a keyboard-instrument player, the object being to provide a more practical, efficient, and desirable instrument of the character described and to render such instrument convenient, compact, and comparatively simple in its structure and operation.

Our invention consists in an instrument having mechanism organized and arranged as illustrated; also in certain details and combinations explained in the following description, the particular subject-matter claimed being hereinafter definitely specified.

Figure 1:
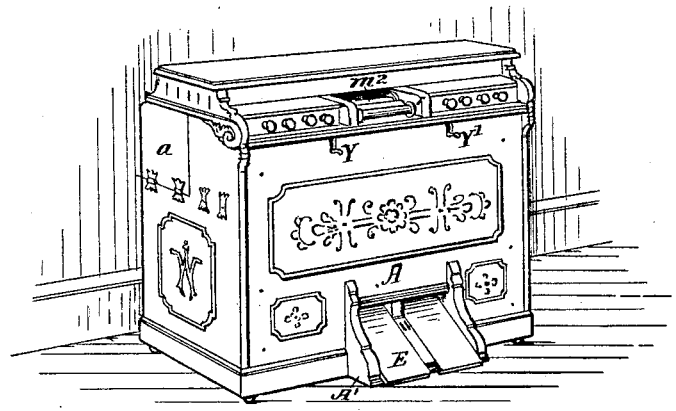
Figure 2:
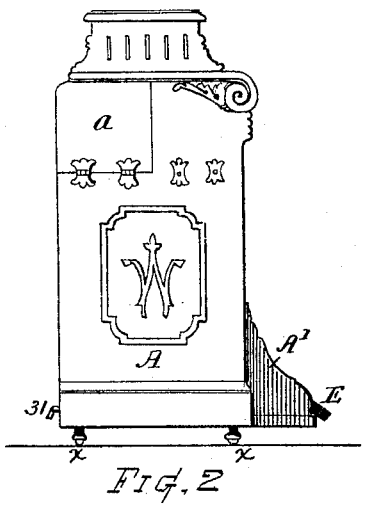
Figure 3:
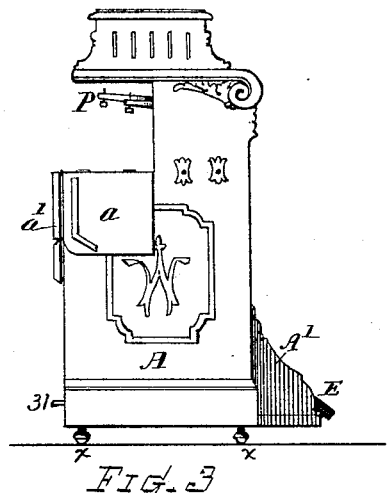
Figure 11:
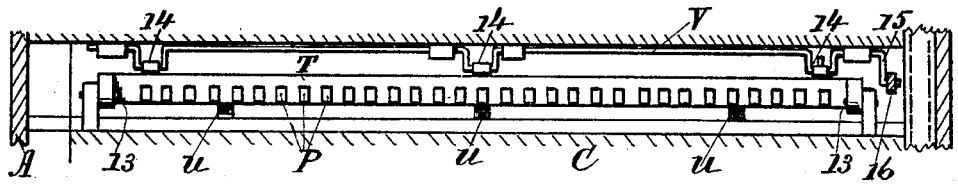
Figure 12:
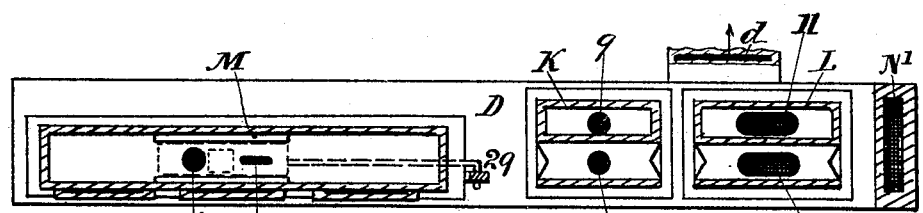
Figure 13:
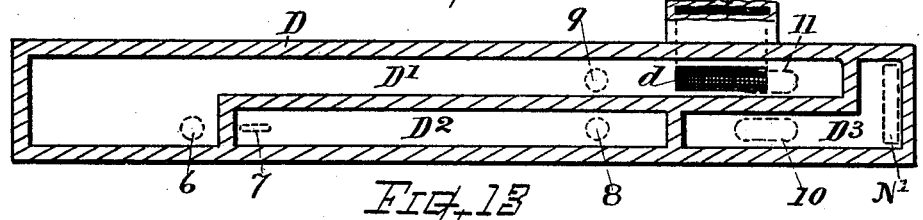
Figure 14:
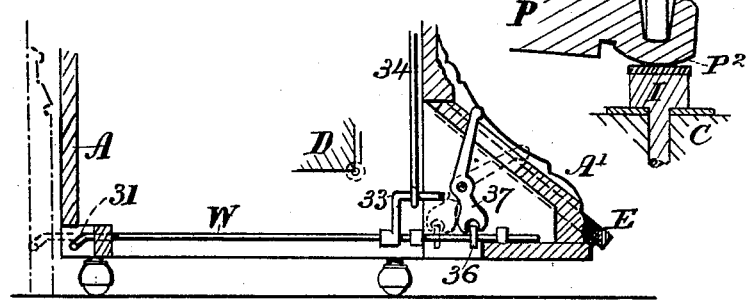

In the drawings, Figure 1 is a perspective exterior view of the instrument-cabinet as closed when not in use. Fig. 2 is an end view of the same. Fig. 3 is an end view showing the cabinet as opened at the back and ends. Fig. 4 is a plan view of the top part, portions being shown in section at different planes to reveal internal structure. Fig. 5 is a horizontal section showing the top of the pneumatic chest, the fulcrum-bar, the finger-levers, the bellows, and pedals. Fig. 6 is a vertical section at line $x\ x$ on Fig. 4 with dotted lines indicating a piano-front and its manual, said view showing the manner in which the instrument is applied to use. Fig. 7 is a vertical section of the fulcrum-bar and adjacent parts on a somewhat larger scale. Fig. 8 is a front elevation view with the front of the cabinet removed and parts of the mechanism shown in section. Fig. 9 is a vertical transverse section showing one of the stop-pulls. Fig. 10 is a transverse vertical section of the motor wind-chest and pressure-regulator. Fig. 11 is a detail front view showing the fulcrum-bar and means for raising and depressing the same. Fig. 12 is a horizontal section above the top of the motor wind-chest. Fig. 13 is a horizontal section through the motor wind-chest. Fig. 14 is a vertical section showing a means for retracting the piano-pedal rockers. Fig. 15 is a detail section at the junction of the finger-lever, actuating-puppet, and valve-pitman; and Fig. 16, Sheet III, is a section showing a removable xylophone beneath the finger-levers and operated thereby.

As shown in the drawings, this improved instrument comprises a cabinet-case A, within which the operative mechanisms are arranged and supported, said cabinet being mounted upon casters and adapted to be conveniently moved around the room. The back of said cabinet is provided with hinged or removable fall-boards $a'$, and its ends provided with sections or doors $a$, that can be opened for admitting the manual-breast of a piano or similar keyboard instrument or closed to form a neat incasement for the mechanism. The casters $x$ are preferably adjustable in height for regulating the height of the playing mechanism to correspond with any piano-keyboard. B indicates the bellows, arranged in the lower rear part of said cabinet and consisting of the reservoir and exhausters B', hinged to the opposite sides of the stationary supporting-board B² in upright slightly-inclined position.

C denotes the chest or box containing the operating-pneumatics F, that move the wire connections $i$ and work the lifter-puppets I, disposed through the top of the chest, also containing the bed of primary or controlling pneumatics $h$, that severally communicate through the tube-board with the tracker inlet-ducts and under control of the perforated music-sheet $m$, advanced across the tracker G, operate the valves 5, that admit or exclude air flowing from the inlet air-trunk F' into the pneumatics F, thereby controlling the inflation and collapse of the several operating-pneumatics in accordance with the music-sheet perforations in well-known manner.

The tracker G projects upward above the front of the chest C at central position, said front being the tube-board within which the air-ducts are formed from the tracker-orifices to the well board or bed of the primary pneumatics $h$.

The spool-frame is arranged preferably horizontal, with the winding-roll $m^2$ in rear of the tracker and the removable music-spool $m'$ in front thereof.

E indicates the pedals hinged to a forwardly-projecting part A' of the cabinet and operating, in conjunction with the springs $e$, swinging angle-levers $e'$, and bars $e^2$, for working the bellow -exhausters B'.

D indicates a long wind-chest disposed below the pneumatic-chest and in front of the bellows and having mounted thereon the motor-engine M and the air-pressure regulators K and L. Said wind-chest has internal partitions, as shown in Fig. 13, dividing its interior into a primary exhaust-compartment D' and secondary compartments $D^2$ and $D^3$. The compartment D' is connected direct with the bellows by the windway $d$. The chamber of the motor M connects by passage 6 with compartment D' and by passage 7 with compartment $D^2$. The regulator K connects by passage 8 with compartment $D^2$ and by passage 9 with compartment D'. The regulator L connects by passage 10 with compartment $D^3$ and by passage 11 with compartment D'.

N indicates an overhead wind-chest with a reed-board $n$, organ-reeds $r$, reed-duct valves $o$, and mutes $s$ and $s'$ combined therewith and supported above the pneumatic-chest and its series of lifter-puppets I. The reed-board $n$ is inclosed in a sound-chamber provided with a movable swell-board $n^2$, the mutes $s$ $s'$ and swell-board $n^2$ being severally connected in suitable manner with stop-pulls $s^2$, $s^3$, and $n^3$ for opening and closing the same.

The wind-chest N is connected by a conductor or air-passage N' with the compartment $D^3$ of the wind-chest D, and thence through the regulator L with the compartment D' and windway $d$ with the bellows-reservoirs. Direct pitman-pins J are arranged for operating the reed-duct valves O from the pneumatically-actuated puppets I, the valve opening as the puppet lifts.

P indicates the finger-levers or key-strikers arranged in series to correspond with manual-keys Q of a piano and centrally fulcrumed in a transversely-grooved horizontal bar T, with their front end resting on the lifter-puppet heads and their rear ends, which are preferably provided with adjusting-buttons P', projecting rearward above the top of the bellows and at such distance therefrom as will admit the manual-breast of a piano beneath the levers, as indicated by dotted lines in Figs. 6 and 7. These finger-levers are made in long and short lengths to conform to the arrangement of the white and black keys of the piano-manual. The front end of each lever is rounded, as at $P^2$, on the under side where seated on the puppet I, (see Fig. 15,) and a hole or cavity $P^3$ is formed therein from the upper side and extending well down into the substance of the lever for the reception of the foot of the reed-valve pitman, which thus has its step-bearing over and near the surface of the puppet-head.

The finger-levers are centrally pivoted in the fulcrum-bar T, the head of the levers ranged in line on the lifting-puppets I and their opposite ends respectively disposed for working the piano-keys, the short levers for contact with the low white keys and the long levers for contact with the high black keys, while their respective fulcrum-pivots $t$ and $t'$ are disposed at different positions on the fulcrum-bar or in a manner to relatively proportion the leverage of the fingers and their movement by the puppet movement to the drop or movement of the manual-key, as required for white or black keys at the point of finger-contact, so that each lever imparts the proper force and movement to its respective key in accord with the potential of the operating-pneumatic, whether giving light or strong impulse and which is influenced for expression by regulation of the current of air entering the trunk F' at the inlet-valve $f^3$.

The fulcrum-bar T, carrying the finger-levers P, is arranged to have upward and downward movement bodily, said bar being best provided with arms or earpieces that are hinged or pivoted at 13 to lugs or blocks fixed to the top of the chest C or equivalent support. Upwardly-acting springs $u$ are provided for raising the fulcrum-bar and finger-levers, and a rocking depressor or shaft V is arranged parallel with the bar and provided with roller arms or cams 14, that force said fulcrum-bar downward or allow it to rise by action of the springs $u$, accordingly as the shaft V is rocked. Said shaft is furnished with a crank 15, which is connected by a link 16 and rocker-lever 17 with the stop-pull 18, (see Figs. 5 and 7,) whereby the fulcrum-bar T and finger-levers P can be depressed for putting the piano into playing operation or raised for throwing the piano out of playing operation, accordingly as the stop 18 is manipulated.

The springs of the reed-duct valves act to press the upright pitmen J down upon the lever ends and both upon the puppet-heads, so as to keep said parts in proper working contact. If in any instance preferred, a special spring can be employed, acting directly upon the finger-lever for pressing its end against the puppet-head and maintaining the contact of said parts while playing free from the manual-keys.

By the construction and combination of the fulcrum-bar and finger-lever mechanism with the pneumatic-actuating devices we provide a very advantageous mechanism, the movement and fingering touch of the levers is rendered quite sensitively controllable and perfect, while the piano and reeds are sounded in instantaneous unison, and the finger-levers can by the swing of the fulcrum-bar be raised more or less from the piano-keyboard without raising their ends P² from the puppet-heads I or interfering with the continued operation of the pitmen J and reed-duct valves by the action of said puppets. Another feature of advantage in the arrangement of the mechanism is the accessibility to the reeds while the instrument is in position for playing the keyboard, thereby enabling a tuner to conveniently draw and tune the reeds $r$ to correspond with the particular piano and while the automatic player is at the situation of use, this too without dismantling the instrument otherwise than by removal or opening of the swell-board $n^2$.

The power and motion from the shaft of the motor M are transmitted to the winding-roll $m^2$ by the pulleys and belt M' and the top shaft 20, which latter is provided with a pinion 21, that meshes with the gear upon the winding-roll, and a pulley 22, that is belted to the rewinding-spool bearing $m^3$, thereby respectively operating said winding-roll for advancing the music-sheet $m$ over the tracker G and said spool for rewinding the same in the manner as heretofore employed in other instruments.

Z indicates the balance-wheel for steadying the motion of the motor-engine.

The gearing for operating the winding and rewinding of the music-sheet is thrown into and out of action by endwise movement of the shaft 20, effected by the connections 23 with the pull 24, and at the same time the throttle-valve 25, controlling the windway from the pneumatic-chest C' to the bellows B, is operated, closing said passage when the rewinding is put into operation, and vice versa. While playing the motor air-current is drawn through the small pass 7 and regulator K, which gives a regular pressure for the power-pneumatics which work the revoluble motor-shaft, but when rewinding the motor-valve is shifted by means of the stop-pull 26, connections 27 and 28, and lever 29, and the motor air-current is then direct through the passage 6 and compartment D' to the bellows, giving rapid action for the rewind of the music-sheet upon its spool. The interior of the pneumatic-chest connects with the bellows through the windway C².

W and W' indicate rocker-shafts arranged at the lower part of the cabinet and having offsetting portions 31, that rest upon and depress the regular piano-pedals 32 for soft and loud expression. Each of said rocker-shafts is provided with a crank-arm 33 at the fore end, from which an upright endwise-movable rod 34 extends up through suitable bearings and is engaged at its upper end by an actuating-lever or means for operating the same by hand, as at Y and Y', said levers being preferably centrally fulcrumed to the chest C or frame and having forwardly-projecting ends that extend through the front of the cabinet at convenient position, as illustrated.

The rocker-shafts necessarily project at the rear of the cabinet when in use, but said rocker-shafts may, if in any instance desired, be made retractable, so as to obviate their projecting and to allow the cabinet to stand close to the base of the room when not in use. For this the rocker-shafts can be formed of two telescoping parts to be drawn out and retracted, or, preferably, as indicated in Fig. 14, to have endwise motion in their bearings, and combined therewith a fixed collar 36 and a shifting lever 37 on each shaft for effecting the retraction and projection of the same over the pedals 32 from the front of the instrument, said shifting levers 37 being preferably arranged in the division-board between the blow-pedals E.

In practice, in some instances, this improved instrument may be desired for use as a portable piano-player only. In such cases the overhead reed-board, reeds, mutes, reed-duct valves, valve-pitmen J, and wind-chest N can be omitted, the other portions of the mechanisms being employed in the same construction and relations as herein specified, and we desire to include such arrangement within the scope of our claims.

In some instances the portable cabinet piano-player may be provided with a supplementary sound-producing mechanism comprising a displaceable or removable bar or frame 40, carrying a xylophone-scale, series of bells or equivalent vibratory sound-producing devices 41, said frame adapted to be readily placed within and removed from the space beneath the finger-levers P when not occupied by the piano-breast, the xylophone being adapted to be played or receive sounding action by or from the finger-levers, which are arranged to work the manual-keys. This removable frame with its sounding devices can readily be shifted or taken out of the space when the instrument is wheeled up to the front of a piano for playing its keyboard, or inserted in the space for employment with the automatic and organ action when the cabinet piano-player is used as an independent instrument, thus affording a very complete and serviceable automatic instrument, and one which can be marketed either with or without the supplementary appliance, as desired by the purchaser.

The bars in the xylophone-scale or vibratory sound devices are best disposed at different levels to accommodate the finger-levers which are arranged for the black keys and white keys of a manual-keyboard, and said fingers may be made to impinge directly upon the vibrators, or, preferably, upon suitable intervening strikers having resilient action or recoil-springs combined therewith, as illustrated, for normally supporting said strikers free from their respective vibratory sounding devices.

We are aware that keyboard-players having levers or strikers in different arrangement have heretofore been made for playing manual-keys. We do not, therefore, herein broadly claim the use of levers for such purpose irrespective of their construction and combination.

We claim as our invention herein to be secured by Letters Patent—

1. In a cabinet automatic piano-player, the cabinet provided with the end doors $a$ and fall-boards $a'$, in combination with the overhead reed-board, the finger-levers beneath said reed-board, the winding-roll, pneumatic-action chest and bellows arranged as described, with the reception-space for the manual-breast of a piano between the reed-board and bellows-top.

2. In an instrument for the purpose specified, the combination with an overhead reed-board, its valves, and a pneumatic-actuating mechanism provided with puppets, the finger-levers resting upon said puppets, the ends thereof adapted for overlying and engaging the manual-key of a piano, and the pitman-pins standing on said finger-levers, and engaging beneath the reed-duct valves, substantially as set forth.

3. In an automatic keyboard-player, the combination with the reed-organ action and pneumatic-actuating mechanism provided with reciprocating puppets; of the movable fulcrum-bar having the series of finger-levers centrally fulcrumed thereon, the ends of said levers resting on the puppet-heads, the reed-valve-operating pitmen respectively standing on said levers over the puppets, and means for raising and depressing said fulcrum-bar to throw said finger-levers from and into contact with the manual-keys, without changing the relation of the pitmen and lever ends upon the puppet-heads.

4. The combination as described, of the pneumatic-chest containing the controlling and operating pneumatics, and the puppets actuated thereby, the tracker having ducts leading to said controlling-pneumatics, the music-sheet-winding roll, the motor wind-chest beneath said pneumatic-chest, the motor-engine and connections for operating said winding-rolls from said engine, the motor-regulator, the wind-inducing bellows connected with said wind-chest, the bellows-actuating pedals, the series of finger-levers projecting over said bellows, their fore ends resting on said puppets, the movable fulcrum-bar supporting said levers, the superimposed reed-board and wind-chest with organ-reeds, reed-duct valves and mutes, the valve-pitmen stepped on the finger-levers to receive motion from the puppet-heads, and means for shifting the music-winding rolls, the finger-levers, and reed sets, severally, into and out of action, all substantially as and for the purposes set forth.

5. In an automatic piano-player, the combination of the actuating-puppets I, the movable fulcrum-bar T, the bar supporting springs $u$, the finger-levers P fulcrumed on said bar, the cranked rock-shaft V having arms or cams 14 for depressing said fulcrum-bar, and the stop-pull 18 and connections for operating said rock-shaft, for the purpose set forth.

6. The finger-lever having the under rounded head with the hole or cavity in the upper side thereof, extending toward the bottom of said head, in combination with the lifter-puppet, the pitman stepped in said cavity, and the fulcrum-support for said lever, for the purpose set forth.

7. In an automatic-organ piano-player, the motor wind-chest internally divided to form the primary exhaust-compartment $D'$ and secondary compartments $D^2$ and $D^3$, in combination with the exhaust-bellows, the air-motor engine, the reed-chest passage and regulators K and L, as shown, for the purposes set forth.

8. In a cabinet automatic piano-player, the combination of the pedal-depressing rockers W W', connection-rods for moving said rockers, and the stops or tilt-levers Y Y' for manipulating said rockers, substantially as set forth.

9. In a cabinet automatic piano-player, the combination with the cabinet and piano-actuating mechanism, of a rocker or lever adapted for depressing the piano-pedal, and means for operating the same, said rocker adapted for retraction or extension into and from the cabinet, and means for effecting its retraction, substantially as set forth.

10. In an automatic piano-player, in combination, with a series of pneumatically-actuated puppets, the finger-levers worked by said puppets, adapted for depressing piano-keys, the slotted vertically-movable bar or frame carrying the fulcrums of said finger-levers which swing within the slots, a detached frame or bar carrying a xylophone-scale supported beneath said finger-levers, and means for elevating and depressing said fulcrum-bar, for the purposes set forth.

11. In combination, with the portable cabinet-case containing the pneumatic-actuating mechanism, wind-inducing bellows, pneumatic motor-engine and music-sheet-propelling devices, and having the finger-levers and the rearwardly-overhanging top above said fingers; the rear fall-board and the doors $a$ hinged at their edges to the ends of said cabinet to swing outward for opening the space below said fingers, and provided with supports for the movable back or fall-board when closed, substantially as set forth.

12. In an automatic piano-player having a pneumatic-actuating mechanism controlled by a perforated music-sheet, an organ reed-action, a series of finger-levers adapted for playing upon the manual-keys of a piano, and means for imparting motion to said finger-levers and reed-action from the pneumatics; the combination with said piano-playing mechanism and its cabinet-case, of the removable frame 40, the xylophone or set of vibratory sounding devices 41 carried upon said frame, and a series of independent resilientlyacting strikers arranged in said removable frame and in intervening conjunction with the sounding devices and finger-levers, and adapted for receiving motion by impingement thereon of the finger-levers, substantially as hereinbefore set forth.

13. An automatic piano-player, comprising, in combination, a cabinet-case supported upon the floor by casters, and provided with a fall-board back, and the doors or removable sections opening at the ends thereof; the series of controlling and operating pneumatics, the tracker and music-sheet, a motor-engine therefor, the pneumatic-actuated puppets, the rearwardly-projecting finger-levers actuated thereby, the movable fulcrum-bar, and the detached removable frame carrying a xylophone and supported beneath said fingers, all substantially as set forth.

Witness our hands this 2d day of April, A. D. 1897.

WM. D. PARKER.
EDWARD H. WHITE.

Witnesses:
HOWARD WHITE,
C. L. PIERCE.